March 3, 1953 H. LANDAUER 2,630,327
LATHE QUICK-CHANGE BORING BAR HOLDER
Filed May 3, 1951
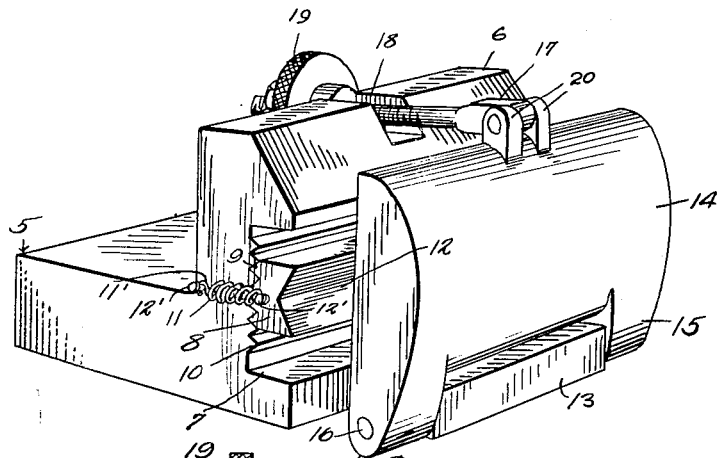
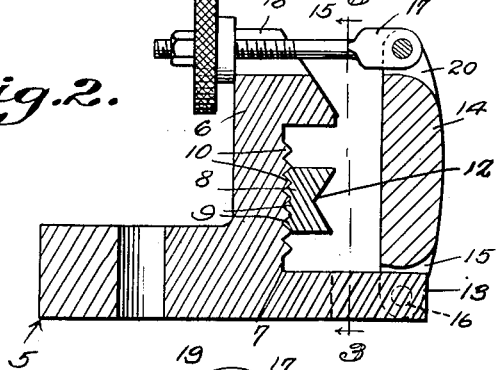
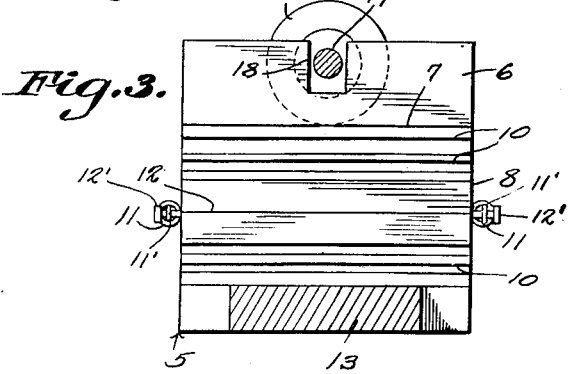
Heinz Landauer
INVENTOR,
BY Sands Calhoun
ATTORNEY Patented Mar. 3, 1953

2,630,327

UNITED STATES PATENT OFFICE 2,630,327

LATHE QUICK-CHANGE BORING BAR HOLDER

Heinz Landauer, Tampa, Fla.

Application May 3, 1951, Serial No. 224,387

1 Claim. (Cl. 279—44)

This invention relates to a boring bar holder designed primarily for use on lathes, threading machines or the like and to obtain maximum rigidity and universality with a minimum of clamping devices as only two screws and nuts are used on the present holder.

The primary object of the invention is to provide a holder of this character wherein the boring bar may be inserted in the holder from either side of the holder or from the top thereof, without the necessity of loosening and swiveling the holder on its rest to gain access to the gripping jaws of the holder.

Another object of the invention is to provide a boring bar holder including a V-block in which the boring bar is gripped, the block being mounted for vertical adjustment so that the boring bar may be properly located for use on lathes having varying center heights, the structure being such that the minimum height is required to accomplish this adjustment.

Still another object of the invention is to provide a holder which will permit the operator to insert a boring bar into the holder without removing the tool bits from the boring bar.

A further object of the invention is to provide a boring bar holder including a stationary jaw and a movable jaw, the movable jaw being operated and secured in its gripping position by means of a bolt swiveled to the movable jaw, the bolt having means for securing the movable jaw in gripping relation with the stationary jaw and V-block held therein, securely holding the boring bar in place.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a perspective view of a quick acting boring bar holder, constructed in accordance with the invention.

Fig. 2 is a vertical sectional view thereof.

Fig. 3 is a sectional view taken on the line 3—3 of Fig. 2.

Referring to the drawing in detail, the boring bar holder comprises the body portion indicated generally by the reference character 5 which is mounted on the usual tool post of a lathe, not shown. The holder also comprises an upstanding jaw member 6 which is formed with a cut-away portion 7, or groove in which the removable jaw member 8 is held.

The jaw member 8 is provided with longitudinally disposed serrations 9 that cooperate with the longitudinally formed serrations 10 formed in the inner wall of the cut-away portion 7.

As clearly shown in Fig. 2 of the drawing, the jaw member 8 is of a width substantially less than the width of the cut-away portion permitting the adjustment of the jaw member 8 within the cut-away portion, to enable the jaw member or boring bar holder to be used on lathes with different center heights.

Coiled springs 11 are provided at the ends of the device and have hooks 11' at their ends positioned over the pins 12' extending from the ends of the jaw members 6 and 8, holding the movable jaw member 8 in various positions of adjustment with respect to the jaw 6.

The jaw member 8 is formed with a V-shaped groove 12 disposed longitudinally of the serration surface thereof, the V-shaped groove providing means for gripping boring bars of various diameters.

Extending forwardly from the body portion 5 is the plate 13 to which the movable jaw 14 is pivotally connected, the jaw 14 having extensions 15 that fit over the side edges of the plate 13, the extensions 15 and plate 13 having registering bores in which the pivot pin 16 is disposed to permit of free pivotal movement of the movable jaw 14.

Disposed intermediate the ends of the upper edge of the movable jaw 14 are spaced ears 20 between which one end of the bolt 17 is pivotally mounted, the bolt being of a length to swing into the cut-out portion 18 of the upstanding jaw member 6 for securing the movable jaw 14 of the holder in gripping relation with the bar held therein.

The bolt 17 is provided with threads throughout the major portion of its length, which threads accommodate the knurled nut 19 which bears against one edge of the upstanding jaw member 6 to draw the movable jaw 14 into clamping relation with the tool held within the V-shaped groove 12 of the jaw member 8.

Due to the construction shown and described, it will be obvious that I have provided a boring bar holder, which will enable the operator to open and close the holder with one hand while inserting the boring bar or tool with the other hand, all of which operation may be carried out with facility.

It will also be seen that it is an easy matter with applicant's structure to adjust the jaw member 8 to adapt the device for use on lathes with different center heights, or with boring bars or tools of various diameters.

From the foregoing it is believed that the construction and operation of the tool holder will be clear and that further description as to the operation and use of the device is unnecessary.

Having thus described the invention, what is claimed is:

A tool holder comprising a body portion, a vertical jaw member formed integral with the body portion, said jaw member having a horizontally disposed groove extending longitudinally of the face thereof, spaced longitudinally disposed enlargements formed on the rear wall of the groove, a removable jaw member of a width substantially less than the width of said groove mounted in said groove for vertical adjustment, spaced longitudinally disposed enlargements on the removable jaw member cooperating with the enlargements in said groove normally holding the removable jaw member against vertical movement within the grooves, springs connected with said removable jaw member and vertical jaw member normally holding said removable jaw member against accidental displacement, and a jaw pivotally connected with the body portion cooperating with the removable jaw member in clamping a lathe tool to the body portion.

HEINZ LANDAUER.

REFERENCES CITED

The following references are of record in the file of this patent:

UNITED STATES PATENTS

| Number | Name | Date |
| --- | --- | --- |
| 625,726 | Halifax | May 23, 1899 |
| 771,111 | Abate | Sept. 27, 1904 |
| 1,477,219 | Halvorsen | Dec. 11, 1923 |
| 1,837,689 | Sunde | Dec. 22, 1931 |
| 2,198,951 | Roush et al. | Apr. 30, 1940 |
| 2,302,943 | Haselwood | Nov. 24, 1942 |